No. 787,565. PATENTED APR. 18, 1905.
H. G. CORYELL & J. E. STEPHENS.
DRY PIPE HEAD.
APPLICATION FILED JULY 29, 1904.
2 SHEETS—SHEET 1.
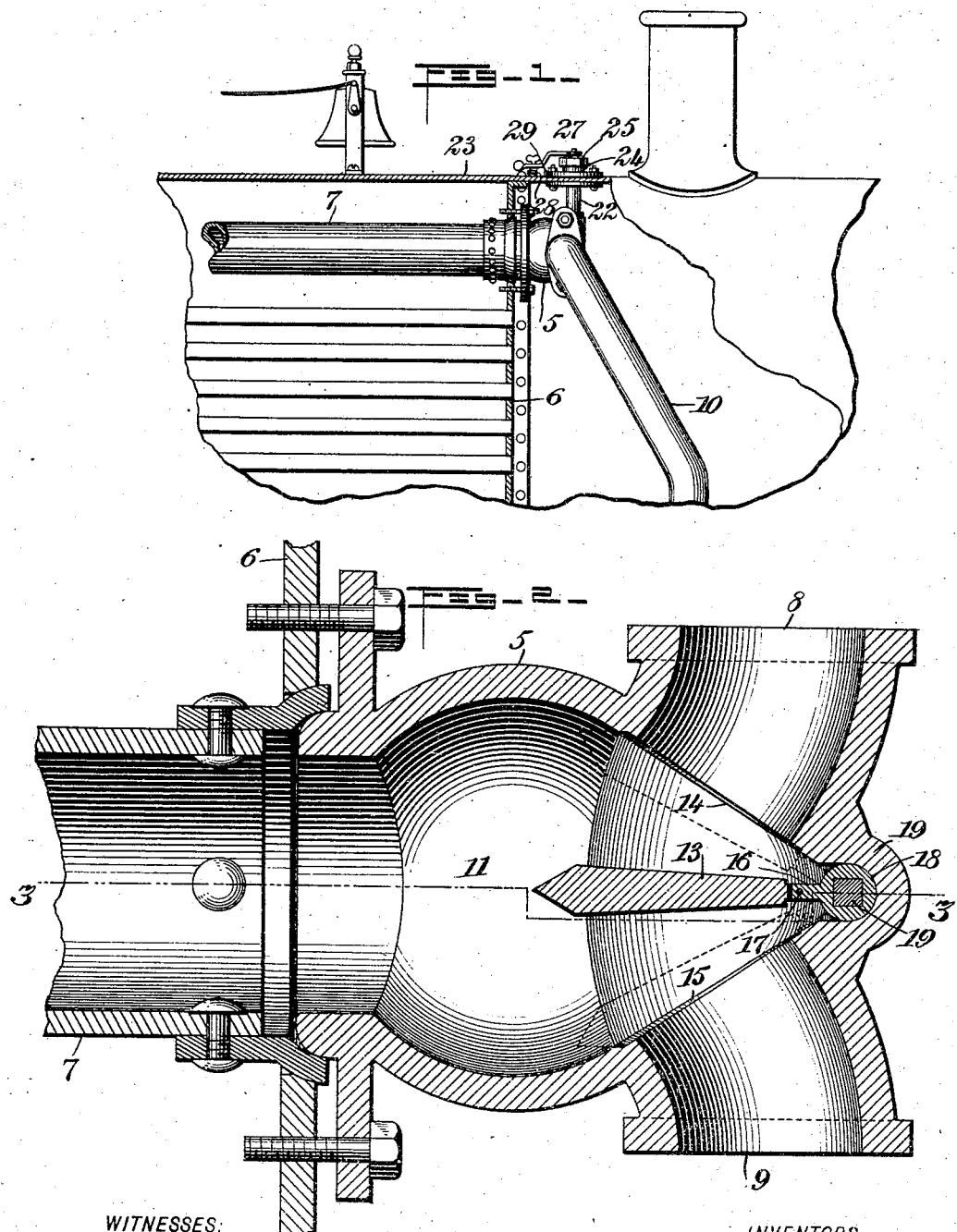
WITNESSES:
INVENTORS
Howard G. Coryell
Joseph E. Stephens
BY
Munn & Co.
ATTORNEYS

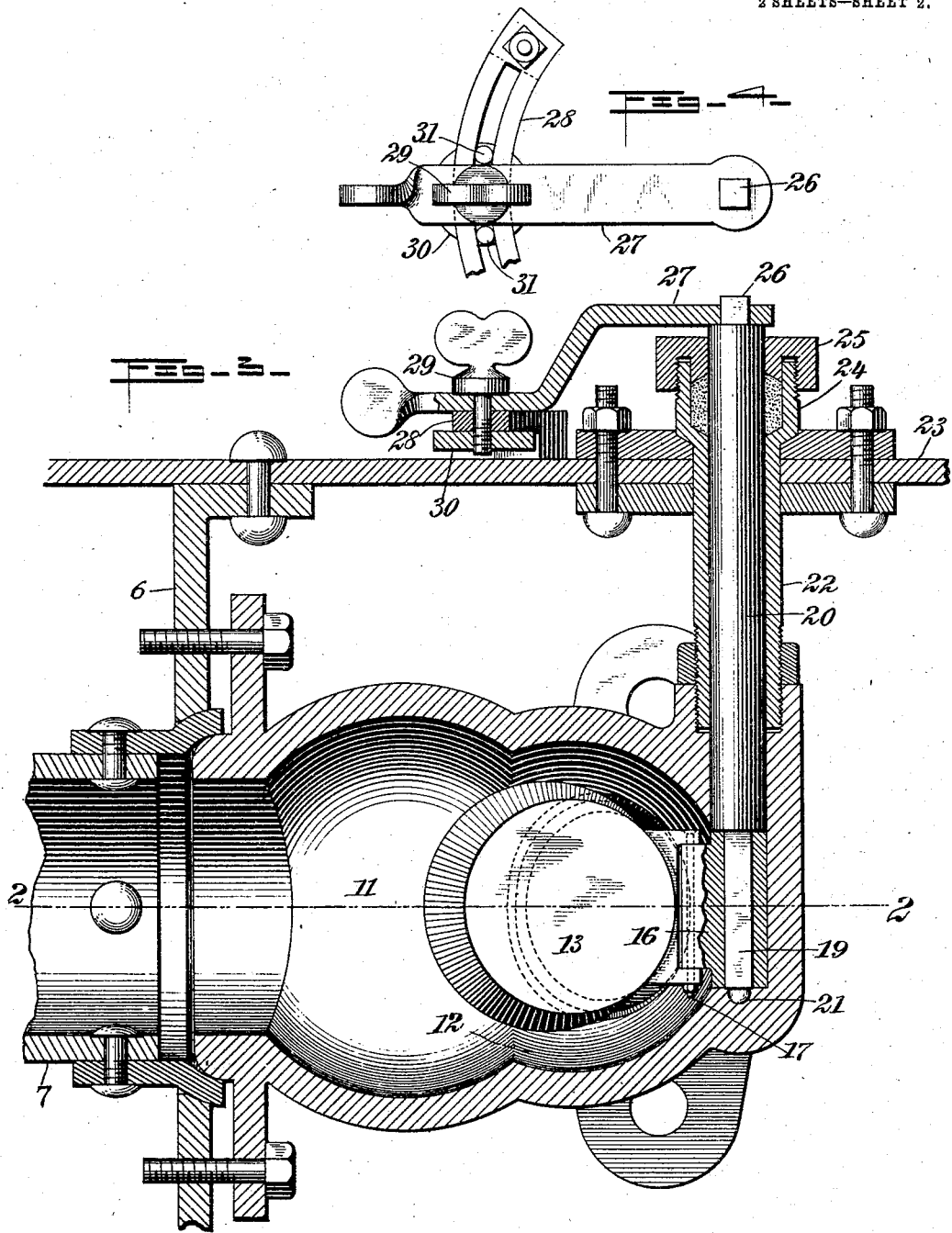

No. 787,565.

Patented April 18, 1905.

UNITED STATES PATENT OFFICE.

HOWARD GOW CORYELL AND JOSEPH EDW. STEPHENS, OF MARIETTA, GEORGIA.

DRY-PIPE HEAD.

SPECIFICATION forming part of Letters Patent No. 787,565, dated April 18, 1905.

Application filed July 29, 1904. Serial No. 218,652.

*To all whom it may concern:*

Be it known that we, HOWARD GOW CORYELL and JOSEPH EDW. STEPHENS, citizens of the United States, and residents of Marietta, in the county of Cobb and State of Georgia, have invented a new and Improved Dry-Pipe Head, of which the following is a full, clear, and exact description.

This invention relates to improvements in heads and valve mechanism for dry pipes in locomotives for controlling the passage of steam to the locomotive steam-chest, an object being to provide in a head a valve designed to be operated from the outside of the locomotive so that steam may be quickly cut off from either one of the steam-chests should breakage or other accident occur to one of the chests.

A further object is to so arrange the valve that it will be self-adjusting to its seats.

We will describe a dry-pipe head embodying our invention and then point out the novel features in the appended claims.

Reference is to be had to the accompanying drawings, forming a part of this specification, in which similar characters of reference indicate corresponding parts in all the figures.

Figure 1 is a side elevation of a dry-pipe head and valve mechanism embodying our invention, showing the same as applied to a locomotive. Fig. 2 is a section thereof on the line 2 2 of Fig. 3. Fig. 3 is a section on the line 3 3 of Fig. 2, and Fig. 4 is a detail view of an adjusting mechanism employed.

The dry-pipe head comprises a casing 5, which communicates through the front tube-sheet 6 with the dry pipe 7. This casing 5 has opposite ports 8 9, which connect with pipes 10, leading to the steam-chests at opposite sides of the locomotive. The casing is provided with an enlarged chamber 11, in the portion 12 of which a valve 13 operates, it being noted that the ports 8 9 lead from the smaller chamber. By providing two chambers, as described, a large area is formed for containing steam, so as to pass readily to and fill the chests when the valve is in a central position. The valve 13 is made in the form of a disk and is designed to engage with either one of the valve-seats 14 15 at the inner ends of the ports 8 9. These valve-seats are made flat, and the valve is also made flat at its surfaces engaging with the seats. The valve is connected to a stem 16 by means of a pivot-pin 17. By this construction the valve is permitted a slight lateral swinging motion with relation to its stem, so as to adjust itself firmly to the valve-seat.

The valve-stem is mounted for rotary motion in a recess 18, formed in a wall of the casing 5, and the portion within said recess is provided with an angular opening to receive a correspondingly-shaped portion 19 of an operating-rod 20. The lower end of the portion 19 has a step-bearing 21 in the wall of the casing, and the upper cylindrical portion passes through a tube 22, the said tube extending through an opening in the locomotive-jacket 23, and above the jacket the tube is provided with a stuffing-box 24, having a screw-cover 25. The upper end of the rod 20 has an angular boss 26, with which a lever 27 removably engages. This lever 27 is movable over an arc-plate 28, provided with a slot through which a locking bolt or screw 29 passes to engage with a nut 30 on the under side of the plate, this nut 30 being provided with pins 31, which engage with the walls of the slot and prevent the nut from rotary movement.

In the operation when the locomotive ruptures a steam-chest, a piston, or any of the steam connections at one side steam may be immediately cut off from that side by turning the valve against the valve-seat of the damaged side. Under ordinary conditions, however, the valve will be locked in its central position, as indicated in Fig. 2, so that steam will be freely passed to both steam-chests.

Having thus described our invention, we claim as new and desire to secure by Letters Patent—

1. In a locomotive, a dry-pipe head comprising a casing having opposite ports for providing communication with the locomotive steam-chest, and a valve mounted to swing in the casing to close either one of said ports, the said valve having a slight lateral swinging motion on its stem.

2. In a locomotive, a dry-pipe head, comprising a casing having opposite ports, a valve for controlling said ports, said valve being mounted to swing relatively to its stem, an operating-rod extending upward from the stem of the valve, a stuffing-box above the locomotive-jacket, through which said rod extends, a lever having connection with the rod, and a segment-plate to which the lever is adapted to be locked.

3. In a locomotive, a dry-pipe head comprising a casing having opposite ports, flat valve-seats at the inner ends of the ports, a disk-valve mounted to swing in the casing and to swing relatively to its stem, the said valve having flat sides for engaging with said flat valve-seats, and means for swinging the valve laterally.

In testimony whereof we have signed our names to this specification in the presence of two subscribing witnesses.

HOWARD GOW CORYELL.
  JOSEPH EDW. STEPHENS.

Witnesses:
  J. L. REED,
  B. T. FREY.